United States Patent [19]

Eaton et al.

[11] Patent Number: 5,412,529
[45] Date of Patent: May 2, 1995

[54] MODULAR WALL PANEL ASSEMBLY COMPRISING POWER SURGE PROTECTOR AND/OR UNINTERRUPTABLE POWER SUPPLY COMPONENTS, AND CONNECTOR ADAPTER UNIT THEREFOR

[75] Inventors: Winston W. Eaton; Thomas H. Patchel; James T. Asaki, all of Raleigh, N.C.; Donald L. Bentley, Franklinville, N.Y.

[73] Assignee: Network Power Systems, Inc., Raleigh, N.C.

[21] Appl. No.: 907,839

[22] Filed: Jul. 2, 1992

[51] Int. Cl.⁶ .................................................. H02H 3/20
[52] U.S. Cl. ...................................... 361/90; 439/215
[58] Field of Search ................... 361/90; 307/66, 147; 439/215

[56] References Cited

U.S. PATENT DOCUMENTS

| | | | |
|---|---|---|---|
| 3,198,991 | 8/1965 | Barnett | 361/627 |
| 3,218,518 | 11/1965 | Asbridge et al. | 361/627 |
| 3,394,287 | 7/1968 | Zitzman et al. | 361/627 |
| 3,443,161 | 5/1969 | King | 439/73 |
| 3,517,266 | 6/1970 | Yoda et al. | 361/627 |
| 3,657,608 | 4/1972 | Leone et al. | 361/627 |
| 3,689,128 | 9/1972 | Andreini et al. | 312/274 |
| 3,775,716 | 8/1973 | Yoshii et al. | 361/627 |
| 3,858,091 | 12/1974 | Wilkinson | 439/221 |
| 4,060,294 | 11/1977 | Haworth et al. | 439/215 |
| 4,203,639 | 5/1980 | Van de Hoek et al. | 439/215 |
| 4,214,799 | 7/1980 | Biche | 439/210 |
| 4,231,630 | 11/1980 | Probst et al. | 439/215 |
| 4,277,123 | 7/1981 | Haworth et al. | 439/215 |
| 4,295,697 | 10/1982 | Grime | 439/215 |
| 4,367,370 | 1/1983 | Wilson et al. | 439/215 |
| 4,403,271 | 9/1983 | Flanigan et al. | 248/27.1 |
| 4,591,949 | 5/1986 | Lahr | 361/627 |
| 4,703,191 | 10/1987 | Ferguson | 307/64 |
| 4,781,609 | 11/1988 | Wilson et al. | 439/215 |
| 4,835,915 | 6/1989 | Nilssen | 52/28 |
| 4,853,838 | 8/1989 | Westerman | 364/189 |
| 4,874,322 | 10/1989 | Dola et al. | 439/215 |
| 4,882,885 | 11/1989 | Chatterson et al. | 439/215 |
| 4,942,805 | 7/1990 | Hellwigi et al. | 98/1 |
| 4,952,164 | 8/1990 | French et al. | 439/215 |
| 4,973,796 | 11/1990 | Dougherty et al. | 174/48 |
| 5,013,252 | 5/1991 | Nienhuis et al. | 439/215 |
| 5,032,086 | 7/1991 | Skowronski et al. | 439/210 |
| 5,049,805 | 9/1991 | Celenza et al. | 323/285 |
| 5,185,536 | 2/1993 | Johnson, Jr. et al. | 307/66 |
| 5,214,314 | 5/1993 | Dillard et al. | 307/147 |
| 5,229,650 | 7/1993 | Kita et al. | 307/66 |

OTHER PUBLICATIONS

"Moveable Walls Systems Furniture/Electrical Wiring Guide" Steel Case, Inc., Grand Rapids, Mich. 49501, copyright 1989.

*Primary Examiner*—A. D. Pellinen
*Assistant Examiner*—Ronald W. Leja
*Attorney, Agent, or Firm*—Steven J. Hultquist

[57] ABSTRACT

A modular wall panel assembly having a concealed prewired electrical system associated therewith comprising a multiwire powerway defining at least one, and preferably multiple power circuits, with the powerway coupled to at least one power protector disposed in interiorly in the wall panel member and providing power protection to a power circuit thereof, wherein the power protector comprises power surge protector (USP) and/or uninterruptable power supply (UPS). A multiwire multicircuit powerway is described comprising at least two power circuits having associated therewith power circuit receptacle terminals constructed so as to allow a compatible receptacle element to be selectively positioned on the powerway in power delivery relationship with any selected one of the multiple power circuits.

16 Claims, 9 Drawing Sheets

MODULAR WALL PANEL ASSEMBLY COMPRISING POWER SURGE PROTECTOR AND/OR UNINTERRUPTABLE POWER SUPPLY COMPONENTS, AND CONNECTOR ADAPTER UNIT THEREFOR

BACKGROUND OF THE INVENTION

1. Field of the Invention

This invention generally relates to a modular wall panel assembly of a type which is used as a partition or divider means in office environments and commercial as well as residential installations, to provide privacy or otherwise demarcate a portion of a larger space, e.g., for workstations or other interior design purposes.

More specifically, the present invention relates to a modular wall panel assembly of such type, which comprises power surge protector and/or uninterruptable power supply components, and to a connector adapter unit for such modular wall panel assemblies.

2. Description of the Related Art

In recent years, advances in the capabilities of computer systems, telecommunications apparatus and methods, and local and extended area voice/data networks have been primary factors in the achievement of improved business productivity, and have become central to contemporary business operations.

At the same time, this technology has become increasingly susceptible to problems of power supply integrity and regularity, particularly as a result of the interconnected character of the associated systems. For example, sensitive computer and communications systems face a host of fairly frequent power irregularities in the course of normal operation. These include electrical disturbances ranging from spikes, surges, sags, noise, and brownouts, to complete power failures. These occurrences can damage can damage the associated systems, destroy critical information, and cripple productivity.

Examples of such dislocations include the power shutdown in the central business district of Chicago, Ill. which occurred in April of 1992 as a result of waters from the Chicago River issuing into underground tunnels containing power transmission lines and equipment for the city, and the recurrent brownouts and occasional blackouts of power in New York, and other cities, as a result of excess load demand on the power grid.

As a parallel trend in business environments, as well as in residential and operational environments, there has been a strong focus on enhancing efficiency, productivity, and visual aesthetics in the creation of "workstations" and other microenvironments, as dedicated sub-areas of larger physical spaces. In order to preserve the flexibility of the overall physical space to accommodate change in shape, size, and physical location of the sub-area within its larger environment, without the necessity of extensive construction or re-construction of the space, it has been common practice to utilize modular wall panels to bound and structurally delineate the sub-area. The sub-area may thereby be variously configured, and may contain a wide variety of microelectronics apparatus, including telecommunications and computer equipment, as desired or appropriate to the activity carried out in such modular space.

It is an object of the present invention to provide an improved modular wall panel assembly which is usefully employed to delineate sub-areas of larger spaces, in a conventional manner, and concurrently affords power protection to powered devices within the delineated modular space, which would otherwise be susceptible to problems of power supply integrity and regularity discussed hereinabove.

It is another object of the present invention to provide a multiwire dedicated circuit connector unit by which modular wall panels equipped with standard electrical receptacles may be readily adapted to the inclusion in the modular wall panels of power protection components.

Other objects and advantages of the present invention will be more fully apparent from the ensuing disclosure and appended claims.

Relative to the various aspects of the present invention herein disclosed and claimed, pertinent art includes the references discussed below. U.S. Pat. No. 4,781,609 issued, Nov. 1, 1988, to H. R. Wilson, et al, describes a wall system including interconnectible prewired wall panels, which utilize a seven-wire electrical system, and a circuit-selected power tab.

U.S. Pat. No. 4,835,915 issued, Jun. 6, 1989, to O.K. Nilssen, describes an office wall partition with an integral lighting means. The partition may include an integral electronic power supply as well as one or more fluorescent and/or incandescent lighting means powered from the power supply. The partition may also feature fluorescent lighting elements at the upper portion of the panel so as to provide indirect illumination.

U.S. Pat. No. 4,874,322 issued, Oct. 17, 1989, to F. P. Dola, et al, discloses a raceway assembly for deploying wires along a surface of a wall or a partition. The raceway assembly includes a rear panel and a cover which define a plurality of elongate compartments in which several cables can be positioned. The rear panel is attachable to a wall surface and electrical outlets can be positioned within the compartments at any location along the wall.

U.S. Pat. No. 4,882,885 issued, Nov. 28, 1989, to L. N. Chatterson, et al, describes a modular partition panel with an interior rectangular framework having coverings on both sides thereof. The panel is provided with channels extending along either or both of the upper and lower edges thereof, for accommodating communication and electrical cables. A porting arrangement is provided which is readily secured to and within the panel, to provide porting for electrical and communication cabling at substantially work surface height.

U.S. Pat. No. 4,952,164 issued, Aug. 28, 1990, to R. M. Weber, et al, discloses an outlet unit for a power distribution system of a modular wall panel unit, which may be selectively connected to a particular pair of line and neutral conductors, from among multiple pairs of such conductors carried by the panel power distribution system. Four separate pairs of line and neutral conductors are present. The outlet unit may be connected to a selected pair of the available pairs of conductors, and by a simple modification of the outlet unit, are connectable to a selected pair of the line and neutral conductors of the system.

U.S. Pat. No. 5,013,252 issued, May 7, 1991, to J. H. Nienhuis, et al, describes an electrified wall panel unit which is interconnectable to other wall panel units, and features a power distribution server which includes four receptacle module ports in an H-shaped configuration.

U.S. Pat. No. 4,277,123 issued, Jul. 7, 1981, to R. G. Haworth, et al, describes a power and communication raceway structure for an electrically prewired wall panel. The raceway structure is in an elongated channel at the lower portion of the panel. The channel contains electrical power terminals and a large number of communication cables extending longitudinally along series-connected panels.

U.S. Pat. No. 4,203,639 issued, May 20, 1980, to H. L. VandeHoek, et al, describes modular free-standing, moveable panel systems which are hard-wired with electrical wiring forming a light circuit and a power circuit.

U.S. Pat. No. 4,295,697 issued Oct. 20, 1981 to P. R. Grime, discloses an electrical power distribution block disposed in the bottom frame portion of a space-dividing panel, between the supporting legs. The distribution block of each panel is electrically connectable to those of other panels in an assembly, and an electrical power supply is connected to one of the blocks. A duplex receptacle is mounted on the distribution block of the panel, and the base cover plate is provided with an access aperture.

U.S. Pat. No. 4,231,630 issued Nov. 4, 1980 to R. L. Probst, et al, discloses an energy supply system which is interfaced with a space divider system comprised of a plurality of wall panels. The energy supply system includes raceway sections having electrical conductors for transmitting electrical energy. Each raceway section is disposed below its associated wall panel adjacent to the lower edge of the panel, to provide an essentially unbroken appearance between the face of the wall panel and the raceway section.

U.S. Pat. No. 4,367,370 issued Jan. 4, 1983 to H. R. Wilson, et al, describes a wall system including series-connectable electrically-prewired panels, in which each panel has a pair of electrically-connected power blocks adjacent the lower corners thereof. The opposed power blocks of adjacent panels are electrically joinable by a flexible electrical connector which plugs into the adjacent power block. The power tabs include a receptacle unit which can be selectively plugged into either or both sides of each power block. Each power tab has a manually actuatable switch so that the power tab when plugged into the power block can be electrically joined to any selected one of three circuits. The electrical system preferably is a five-wire type providing these three different circuits at each power block.

U.S. Pat. No. 4,060,294 issued Nov. 29, 1977 to R. G. Hayworth, et al, describes a wall panel with a lower raceway structure extending across the width of the panel and flush with the side walls thereof. The opposite ends of the raceway terminate in power blocks, each having a conventional socket associated with the sides to permit electrical plug insertion. The power blocks can associate a flexible connector on either side of the panel, so that a single panel can be electrically connected to two adjacent panels. the individual panels may be formed with a hollow rectangular frame to accommodate a main power cable extending downwardly from the ceiling through the panel to interconnect with one of the power blocks for energizing all of the power blocks associated with the wall structure.

U.S. Pat. No. 4,973,796 issued Nov. 27, 1990 to R. Dougherty, et al, describes a wall structure for removably positioning panels and brackets. The wall structure is provided with a pair of electrical buses adapted to be contacted by an electrical clip at any one of a plurality of different heights.

U.S. Pat. No. 4,214,799 issued Jul. 29, 1980 to B. A. Biche discloses a feed-through connector which allows the interconnection of adjoining circuit modules, such as prewired wall panels, in any one of a variety of angular orientations. The connector includes a dielectric housing having at least one recess around its periphery and at least one conductive plate mounted within the recess, with the recess and plate together forming a connector receptacle.

SUMMARY OF THE INVENTION

In one aspect, the present invention relates to a modular wall panel assembly comprising a space-dividing modular wall panel member having a concealed prewired electrical system associated therewith comprising a multiwire powerway defining at least one, and preferably multiple, power circuits, and including means for connecting the powerway to an external power supply means and means for connecting the powerway to output circuit(s) or device(s) disposed exteriorly of the wall panel member, with the powerway coupled to at least one power protection means interiorly disposed in the wall panel member and providing power protection to a power circuit thereof, e.g., in the case of multiple power circuits, to at least one of the multiple power circuits, wherein the power protection means comprises at least one member selected from the group consisting of (i) power surge protector (PSP) means, and (ii) uninterruptable power supply (UPS) means.

In a particularly preferred embodiment, the power protection means comprises PSP means as well as UPS means, in a power protection circuit coupled to a power circuit of the modular wall panel assembly, or in the case of multiple power circuits, to at least one of such multiple power circuits, wherein the power protection circuit comprises a power surge suppresser unit, a rectifier unit, and an inverter unit, respectively, connected by a main power protection circuit line in series relationship with one another between the power circuit(s) and the output circuit(s) or device(s) connection means. A first branch loop of the power protection circuit is joined at a first end thereof to the main power protection circuit line between the surge suppresser unit and the rectifier unit, and contains a battery charger in series relationship with a battery chargeable thereby. The first branch loop at a second end thereof is joined to the inverter unit, so that the battery is coupled to the inverter unit. A second branch loop of the power protection circuit is joined at a first end thereof to the main power protection circuit line between the surge suppresser unit and the rectifier unit, and is joined at a second end thereof to a bypass switch selectively coupleable to the main power protection circuit line between the inverter unit and the output circuit(s) or device(s) connection means, to thereby bypass the rectifier unit and the inverter unit.

The above-described power protection circuit is suitably constructed and arranged, e.g., by a microprocessor control unit, to direct (i) a portion of the power entering the main power protection circuit line into the second branch loop of the circuit for charging of the battery during normal operation, so that the battery is maintained in a charged state, (ii) the power entering the main power protection circuit line, upon overload or inverter unit failure, into the first branch loop of the circuit, (iii) power from the battery to the inverter unit in the event of a deficit in the power entering the main power protection circuit line from the external power supply means, (iv) charging of the battery upon return of desired power entering the main power protection circuit line from the external power supply means subsequent to condition (iii), and (v) shut-off of power to the output circuit(s) or device(s) upon discharging of the battery to a predetermined low level of charge subsequent to extended occurrence of condition (iii).

The power protection circuit may also advantageously comprise suitable power (electrical signal) filtering means, such as electromagnetic interference (EMI) filters and/or radio frequency interference (RFI) filters. By such provision, the incoming AC commercial power is filtered to reduce spikes and noise, e.g., by clamping of transient voltages.

In another aspect, the invention relates to a wall panel assembly of the type first broadly described above, wherein the powerway defines at least three power circuits, comprising a first power circuit which is unprotected by any power protection means, a second power circuit which is protected by a PSP device, and a third power circuit which is protected by a UPS device:

In a preferred embodiment, the powerway comprises an 8-wire system defining 3 power circuits including 3 hot wires with a shared neutral wire and a shared ground wire, and a separate, dedicated, fourth power circuit with its own hot, neutral, and ground wires. This powerway may for example be connected with three-phase, 208Y/120 V service, or with single-phase, 240/120 V service.

An 8-wire system of the aforementioned type thus defines first, second, and third power circuits with shared neutral and ground wires, and a fourth, dedicated power circuit. In such arrangement, the first circuit may be unprotected by any power protection means, the second and third circuits may be protected by a PSP device, and the fourth circuit may be protected by a UPS device.

Alternatively, the powerway may comprise a 5-wire, three circuit system, or any other multiwire power circuit-defining system.

In a further aspect, the invention relates to a powerway, or power connector, which defines a multiwire multicircuit system comprising at least two, and preferably at least three, power circuits having associated therewith power circuit receptacle terminals constructed to allow a compatible receptacle element to be selectively positioned on the powerway in power delivery relationship with any selected one of the multiple power circuits.

In this manner, a given receptacle element may be positioned and repositioned on any of the separate receptacle terminals of the powerway, whereby the external output circuit or device may be readily and conveniently switched from one power circuit to another, depending on a desired mode of operation. In this manner, the powerway can accommodate various types of receptacle elements, e.g., simplex, duplex, triplex, and multiplex units, and each receptacle element can be connected to any of the various power circuits of the powerway.

Further, the powerway, when provided with multiple receptacle terminals for each of the respective power circuits, may be readily and conveniently reconfigured to accommodate a functional change in the workstation activity of the area bounded by the wall panel assembly, so that the receptacles may for example for concentrated on power circuits equipped with PSP and/or UPS protection for computers, faxes, and other communications and process equipment, while providing unprotected circuitry for non-critical external output circuits or devices, e.g., electric pencil sharpeners, illuminated decorative displays, etc.

Other aspects and features of the invention will be more fully apparent from the ensuing disclosure and appended claims.

DETAILED DESCRIPTION OF THE INVENTION, AND PREFERRED EMBODIMENTS THEREOF

The present invention provides a fully integrated and concealed power protection subassembly in a modular wall panel assembly of a type which is usefully employed as a moveable space-divider or partitioning element for demarcating and bounding a sub-area of a larger space.

Figure 1:
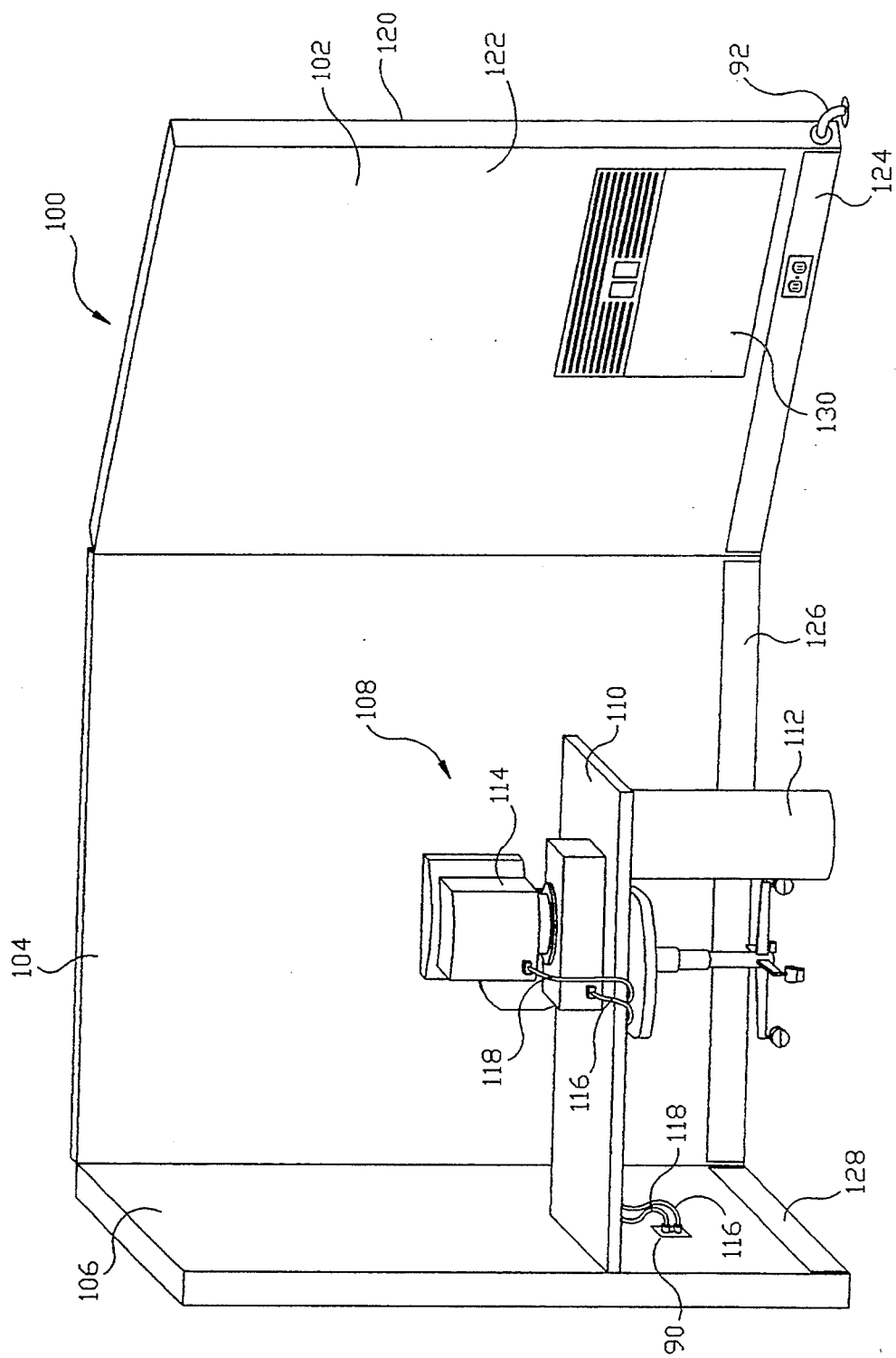
FIG. 1 is a perspective view of a wall panel assembly according to one embodiment of the present invention.

Referring to the drawings, FIG. 1 shows a perspective view comprising a wall panel assembly according to one embodiment of the present invention. The wall panel structure (super-assembly) 100 comprises an interconnected arrangement of modular wall assemblies 102, 104 and 106, each of which is coupled at contiguous side(s) to an adjacent assembly by means of connectors of a type well known in the art, as for example is show and described in U.S. Pat. No. 4,203,639, the disclosure of which hereby is incorporated herein by reference in its entirety.

Wall panel assembly 102 constitutes a panel assembly in accordance with the present invention, including power protection circuitry disposed in the interior of the panel behind face plate 130. The wall panel assembly itself has two main panels 120 and 122 in spaced relationship to one another, to define a thickness and interior volume of the wall panel assembly therebetween.

The power protection circuitry cover constituted by face plate 130 fits over and is associated with a modular power protection circuit as hereinafter described in greater detail.

At the lower portion of each of the respect panel assemblies 102, 104 and 106 is a powerway structure, associated with powerway covers 124, 126, and 128, respectively.

By the arrangement shown in FIG. 1, the wall panel superassembly 100 functions to demarcate and bound a space associated with workstation 108.

Workstation 108 comprises a table or work surface member 110 which at one edge thereof is secured, as for example by suitable mechanical fastener means, to modular wall panel assembly 106. The table or work surface member 110 at its opposite end portion is attached to a pedestal 112 serving with wall panel assembly 106 to support the member 110.

Disposed on the top surface of table or work surface member 110 is a desk-top computer 114 comprising monitor and central processing unit (disk drive) components, which are connected by means of power cables 116 and 118 to power circuitry disposed within the associated modular wall panel assembly 106. The power circuitry is concealed in the wall panel assembly and communicates with the electrical outlet receptacle 90, accommodating plug connectors associated with cables 116 and 118 as shown. The interiorly disposed power circuitry in panel assembly 106 is connected to a powerway (not shown) in panel assembly 106, which in turn is coupled to power-ways in wall panel assemblies 104 and 102, respectively, being joined in a known manner. The powerways in the respective wall panel assemblies are accessible by removal of the respective powerway covers 124, 126 and 128. At the right-hand extremity of wall panel assembly 102 as shown, the powerway therein is coupled to power transmission cable 92 which passes into the flooring on which the wall panel super-assembly 100 is reposed. Cable 92 in turn is connected to a suitable base power-in structure delivering electrical service from beneath the floor on which wall panel super-assembly 100 is reposed.

Wall panel assembly 102 has a concealed prewired electrical system associated therewith, comprising a multiwire powerway defining at least one, and preferably multiple, power circuits. The powerway is coupled to at least one power protection means (not shown) interiorly disposed in the wall panel member and providing power protection to a circuit thereof, e.g., in the case of multiple power circuits, to at least one of the multiple power circuits.

The power protection means associated with wall panel assembly 102 may comprise power surge protector (PSP) means and/or uninterruptable power supply (UPS) means.

By such arrangement, the computer 114 in the work station 108 of FIG. 1 may be coupled to the PSP means, the UPS means, or both means simultaneously, whereby the PSP means functions to prevent the incidence of power surges from damaging the computer 114 or associated electronic media employed therewith, and whereby the UPS means functions to provide a back-up power supply in the event that the base-in power level is below a desired or required threshold value, or, indeed, if shut-down or failure of power from the normal power supply occurs.

The UPS means usefully employed with the present invention may be of the aforementioned type, furnishing "make-up" power to compensate for attenuated power input from the base-in supply means, as well as full power back-up in the event of power failure in toto. Alternatively, the UPS means may be of a type which merely functions to provide a switched-on power source in the event of power failure, but it generally is preferred in practice to employ a UPS unit having "make-up" capacity.

Illustrative of suitable UPS units which may be employed in the broad practice of the present invention are the on-line uninterruptable power systems commercially available from Exide Electronics (Raleigh, N.C.) under the trademark Powerware™, as well as the UPS units commercially available from Best Power Technology, Inc. (Necedah, Wis.) under the trademarks FERRUPS® and Fortress™.

Illustrative of useful PSP means which may be employed in the broad practice of the invention are the OEM wire-in suppressors commercially available from EFI Electronics Corporation (Salt Lake City, Utah), in 120 volt-20 amp and 220 volt-20 amp models, and the PSP units commercially available from Best Power Technology, Inc. (Necedah, Wisconsin) under the trademark SpikeFree™.

In a preferred embodiment, the power protection means comprises PSP means as well as UPS means, in a power protection circuit coupled to a power circuit of a modular wall panel assembly, or in the case of multiple power circuits, to at least one of such multiple power circuits, wherein the power protection circuit comprises a power surge suppressor unit, a rectifier unit, and an inverter unit, respectively, connected by a main power protection circuit line in series relationship with one another, before the output circuit(s) or device(s) connection means.

The power protection circuit may also advantageously utilize suitable power (electrical signal) filtering means, such as electromagnetic intereference (EMI) filters and/or radio frequency interference (RFI) filters.

By such provision, the incoming AC commercial power is filtered to reduce spikes and noise, e.g., by clamping of transient voltages.

Figure 2:
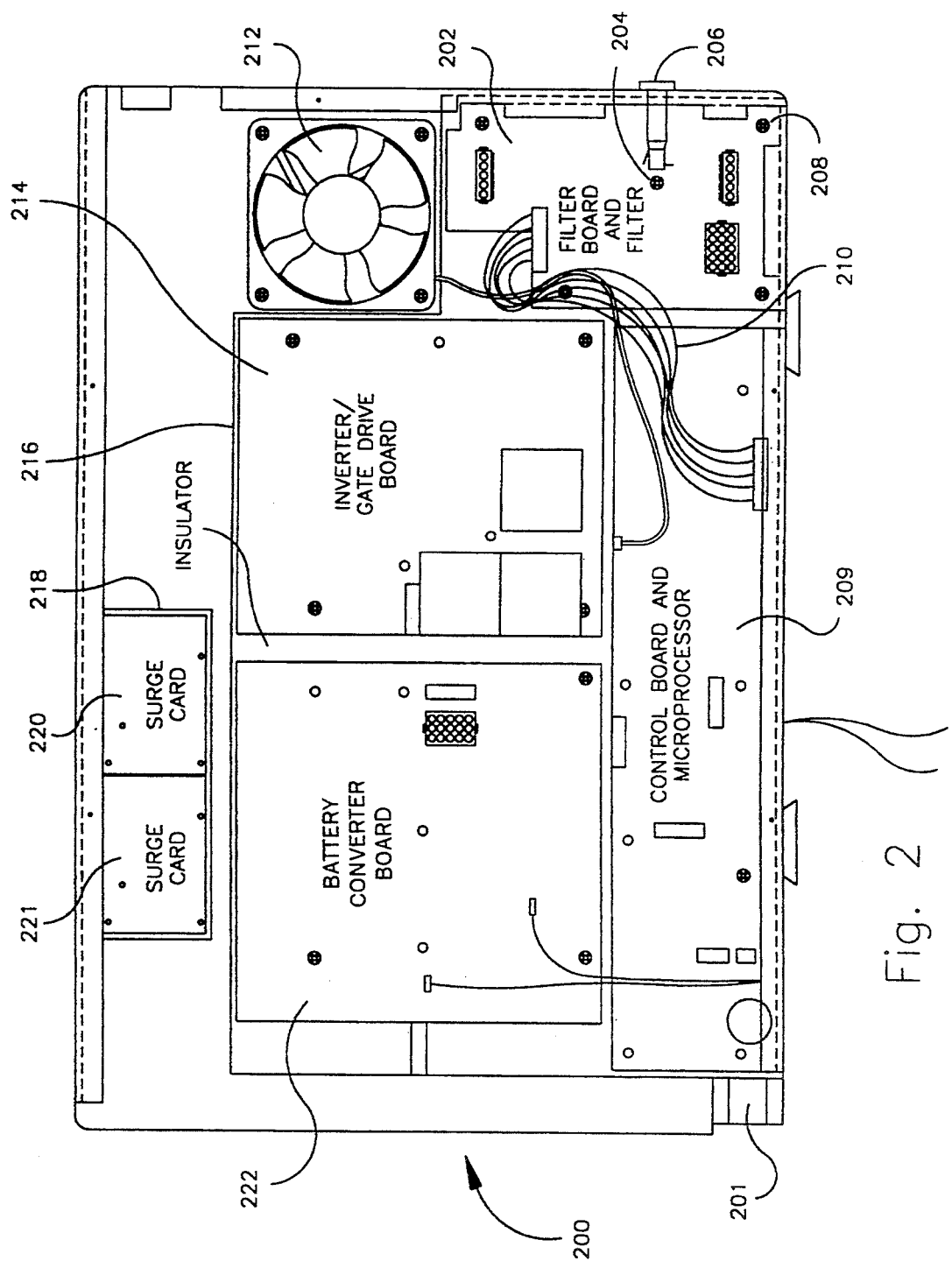
FIG. 2 is a front elevation view of the power protection module of the wall panel assembly shown in FIG. 1.

Referring now to FIG. 2, there is shown the main assembly 200 which is disposed behind power protection circuit cover member 130 in the illustrative embodiment of FIG. 1.

The main assembly 200 comprises a filter board 202 for carrying out the aforementioned power filtering function by means of filter elements minimizing and preferably eliminating EMI and RFI.

Filter board 202 has associated therewith a ground screw 204 and fuse holder 206 containing a fuse of appropriate rating for the filter microcircuitry associated with filter board 202. At the lower right hand corner of the filter board 202 as shown, there is provided a chassis ground screw 208 for appropriate grounding of the filter circuitry through the chassis ground.

Cable 210 provides the incoming electrical signal to the filter board from an in-feed position adjacent control board 209, with control board 209 including a microprocessor control unit for the power protection unit.

Adjacent the control board 209 is battery convertor board 222 having associated therewith battery power supply means (not shown in FIG. 2) constituting the UPS back-up power supply.

The power protection circuit includes surge cards 220 and 221, mounted on insulator 218, providing power surge protection for the incoming electrical power.

Mounted on insulator 216, together with battery convertor board 222, is an inverter/gate drive board 214.

Associated with the foregoing power protection circuit elements is a fan assembly 212 for cooling of the circuitry.

As mentioned, the power protection circuit of the type illustratively shown in FIG. 2 may comprise a power surge suppressor unit, a rectifier unit, and an inverter unit, respectively, connected by a main power protection circuit line in series relationship with one another between the power circuit(s) and the output circuit(s) or device(s) connection means. As an example, a first branch loop of the power protection circuit may be provided and joined at a first end thereof to the main power protection circuit line between the surge suppressor unit and the rectifier unit, with a battery charger in series relationship with a battery chargeable thereby. The first branch loop at a second end may be joined to the inverter unit, so that the battery is coupled to the inverter unit. A second branch loop of the power protection circuit may be provided and joined at a first end thereof to the main power protection circuit line between the main surge suppressor unit and the rectifier unit, and such second branch loop may be joined at a second end thereof to a bypass switch selectively coupleable to the main power protection circuit line between the inverter unit and the output circuit(s) or device(s) connection means, so as to bypass the rectifier unit and the inverter unit, if desired.

The above-described power protection circuit may be suitably constructed and arranged, as for example by a microprocessor control unit (control board 209), to direct (i) a portion of the power entering the main power protection circuit line into the second branch loop of the circuit for charging of the battery during normal operation, so that the battery is maintained in a charged state, (ii) the power entering the main power protection circuit line, upon overload or inverter unit failure, into the first branch loop of the circuit, (iii) power from the battery to the inverter unit in the event of a deficit in the power entering the main power protection circuit line from the external power supply means, (iv) charging of the battery upon return of the desired power entering the main power protection circuit line from the external power supply means subsequent to condition (iii), and (v) shut-off of power to the output circuit(s) or device(s) upon discharging of the battery to a predetermined level of charge subsequent to extended occurrence of condition (iii).

In the power protection circuit sub-assembly shown in FIG. 2, the main power cable may be coupled with the power protection circuit by passage through port 201 at the lower left-hand portion of the sub-assembly as shown.

Figure 3A:
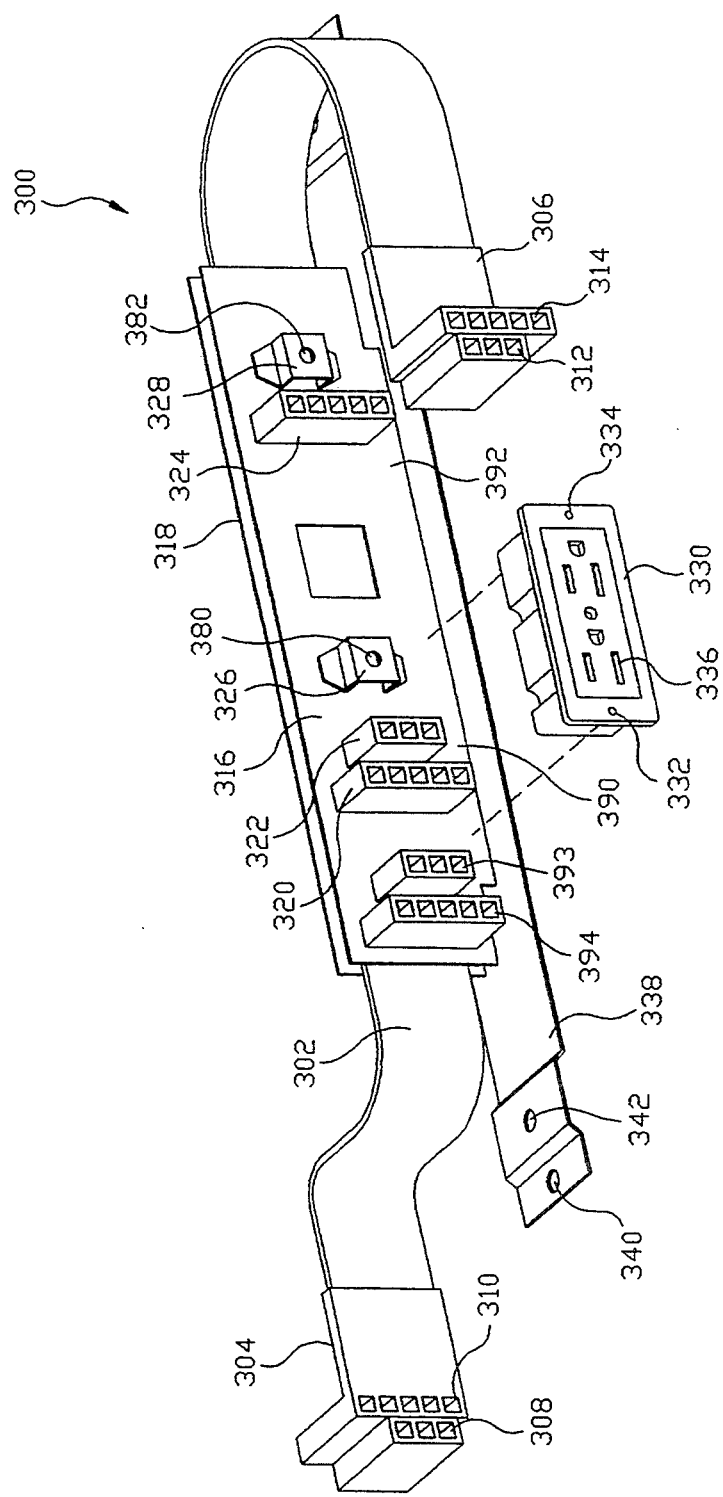
FIG. 3A is a perspective view of a powerway according to one embodiment of the present invention, and receptacle elements matable therewith.

Referring now to FIG. 3A, there is shown a perspective view of a powerway (connector) sub-assembly which may be usefully employed in the modular wall panel assemblies of the present invention, as for example of the type shown in FIG. 1.

The powerway 300 may be employed to distribute power through the base of the modular wall panel assemblies such as those illustratively shown in FIG. 1. Such connector device has flag connector portions 304 and 306 and is of a general type available from Steelcase, Inc. (Grand Rapids, MI) and described in the aforementioned U.S. Pat. No. 4,203,639, but modified as hereinafter more fully described.

The powerway 300, by virtue of the respective flag connectors 304 and 306, eliminates the need for separate panel-to-panel connectors, and is readily employed to make a variety of connections, as described in "Moveable Walls Systems Furniture/Electrical Wiring Guide", copyright 1989, Steelcase, Inc., the description of which hereby is incorporated herein by reference.

The powerway may be suitably color-coded, with powerway portion 390 being for example green in color and powerway portion 392 being for example yellow in color, and hereafter respectively referred to as the "green end" and "yellow end" of the powerway.

The green end 390 and associated flag connector 302 accommodates matable engagement with the flag connector from an adjacent powerway, or a flag connector from a power/cable pole, or coupling with a base power-in or receptacles, by means of the quick-disconnect terminal at the extremity thereof comprising a three-terminal array 308 and a five-terminal array 310.

At its yellow end 392, the flag connector 306 comprises a quick-disconnect terminal including a three-terminal array 312 and adjacent five-terminal array 314, permitting such end of the powerway to be coupled to a matably engagable receptacle.

Thus, the powerway has two flag connectors, and either one can be used to make an electrical connection. Nonetheless, only the green end 390 of the powerway contains flag terminals, so whichever flag is used, it must plug into the green end of the next succeeding powerway, in order to continue electrical distribution. Thus, when two powerways are coupled with one another, there must be at least one green end at each intersection, and there can never be more than one yellow end per intersection.

Referring again to FIG. 3A, the conductor cable 302 may suitably comprise an AWM 8 conductor 1/10 AWG and 7/12 AWG 90° C. 600 volt cable, which extends the connector extremities of the powerway through the space between side walls 316 and 318, which extend upwardly from and are joined to base member 338, provided with openings 340 and 342 at its extremities, for the purpose of joining in the powerway, by means of suitable mechanical fasteners, to the lower portion of the wall panel assembly.

The powerway at its green end 390 comprises a coupling including 5 receptacle array 394 positioned adjacent to three terminal receptacle 393. Longitudinally spaced from this quick disconnect terminal arrangement is a second disconnect terminal comprising 5 terminal array 320, and three terminal array 322. Adjacent to these respective quick disconnect terminals is a mounting bracket 326 having a mechanical fastener opening 380 therein.

At the yellow end 392 of the connector is provided a quick disconnect terminal including 5 terminal coupling 324, adjacent a second mounting bracket 328 having mechanical fastener opening 382 therein.

The powerway 300 comprises an 8 wire dedicated circuit device, whereby the duplex powerway receptacle 330, having mechanical fastener openings 332 and 334 at its respective ends and two outlets 336, may be selectively coupled with any of the quick disconnect terminals on the powerway, to permit the receptacle to have a specific type of power circuit associated therewith—e.g., a power circuit not containing any power circuit protection means; or alternatively a power circuit comprising PSP means; or a power circuit comprising UPS means, or a power circuit comprising both PSP and UPS means.

Accordingly, the receptacle 330 may be coupled selectively to the first quick disconnect terminal comprising terminal arrays 393 and 394, or the second disconnect terminal quick disconnect terminal comprising terminal arrays 320 and 322, or the third quick disconnect terminal comprising terminal array 324. For this purpose, receptacle 330 is arranged to be selectively repositionable from a given quick disconnect terminal to another, as desired, to correspondingly switch the receptacle and equipment plug thereinto, to another type of power circuit among the various power circuits afforded by the powerway.

Figure 3B:
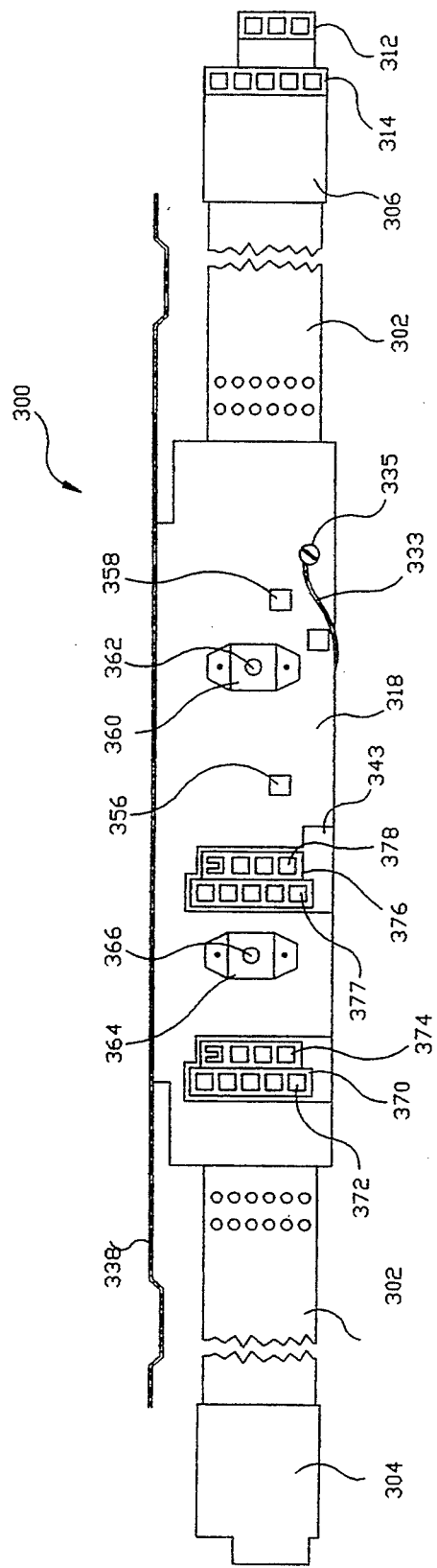
FIG. 3B is a rear elevation view of the powerway of FIG. 3A, showing the reverse side thereof.

FIG. 3B is a front elevation of the reverse side of the powerway from that shown in FIG. 3A, wherein the same parts are correspondingly numbered with respect to FIG. 3A.

As shown, the powerway on its back side wall 318 features mounting brack 364 having mechanical fastener opening 366 therein, and a second mounting bracket 360 having mechanical fastener opening 362 therein. A ground wire 333 from the multiwire cable 302 extends exteriorly of the spaced-apart double walls 318 and 316, and is joined to a ground screw 335 secured to side wall 318.

The side of the powerway shown in FIG. 3B comprises a first quick disconnect terminal 370 including 5 terminal array 372 and 3 terminal array 374. Longitudinally spaced from the first quick disconnect terminal 370 is a second quick disconnect terminal 376 comprising a 5 terminal array 377 and a three terminal array 378.

Side wall 318 features openings 356 and 358 therein to accommodate detents therein protruding outwardly from the main body 343 of the powerway, to secure the main connector body 343 between the side walls.

By the quick disconnect terminal arrangement shown in FIG. 3B, the powerway receptacle 330 of FIG. 3A can be selectively coupled with quick disconnect terminal 376 to provide a fourth circuit connection to the 8 wire powerway circuit, for yet another modality of power circuit protection.

Figure 4:
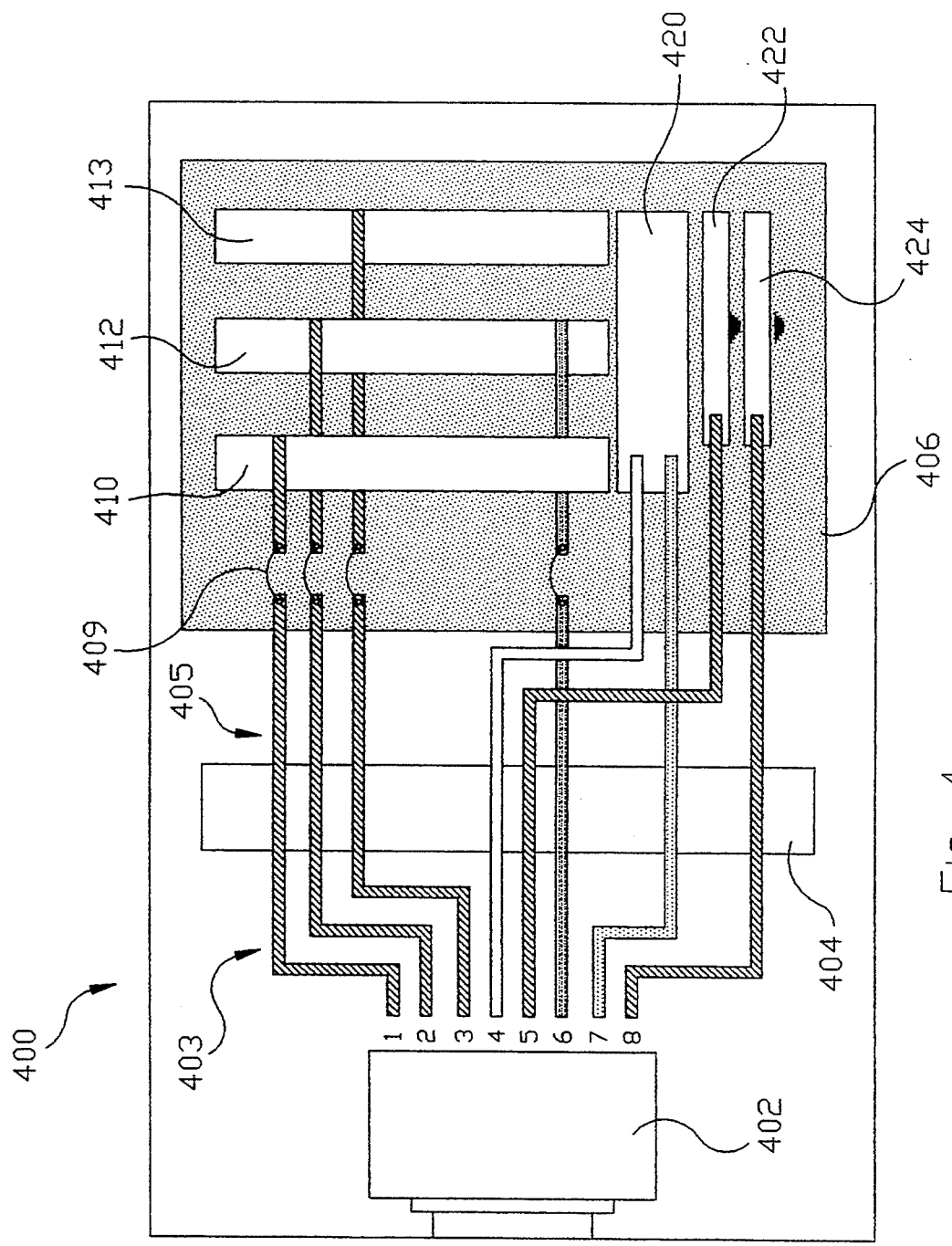
FIG. 4 is a schematic depiction of the wire layout associated with an 8-wire, 4-circuit system which may usefully be employed in the powerway and the wall panel assembly of the present invention.

FIG. 4 is a schematic representation of an 8-wire system such as may be utilized with the power way device of FIGS. 3A and 3B.

In this multiwire branch circuit system, 8 wires, number 1 through 8, are provided, including a ground wire 5 which also functions as a safety ground for electrical furniture and appliances coupled to the powerway.

From the base power-end 402, the 8 wires, comprising neutral wires 4 and 7, joined to neutral 420 of the surface panel 406, ground wire 5 joined to ground 422 and wire 8 joined to isolated ground 424 and hot wires 1,2, 3 and 6, include a first portion 403 extending from the base power-end 402 to junction box 404 and a subsequent building wires portion 405 passing to junction box 406, provided with sequential circuit breakers 409 on the hot wires, and with the hot wires joined to building service panel lines 410, 412, and 413.

By this arrangement, an 8 wire, 4 circuit system is provided, including 3 circuits with shared neutral and ground wires, and a completely separate circuit with its own hot, neutral, and ground wires.

When the separate hot, neutral, and ground wires are connected to a building-supplied isolated ground 424, a ground-isolated circuit is provided that can be dedicated to particularly sensitive equipment such as computers, telecommunications equipment, and the like.

This illustrative 4 circuit, 8-wire system may be employed with three-phase, 208Y/20 V service, as well as single-phase 240/120 V service.

The four separate circuits provided by the 8-wire system schematically shown in FIG. 4 thus may be employed to provide different levels of power quality or power protection, as may be required by various output devices (e.g., personal computers, network servers, routers, and peripherals): standard utility power, electrical surge protection, data surge protection, and clean uninterruptable power circuits, respectively.

For maximum protection, a specific power circuit of the multicircuit system associated with the powerway shown and described with reference to FIGS. 3A and 3B hereof, may utilize the circuit schematically shown in FIG. 5.

Figure 5:
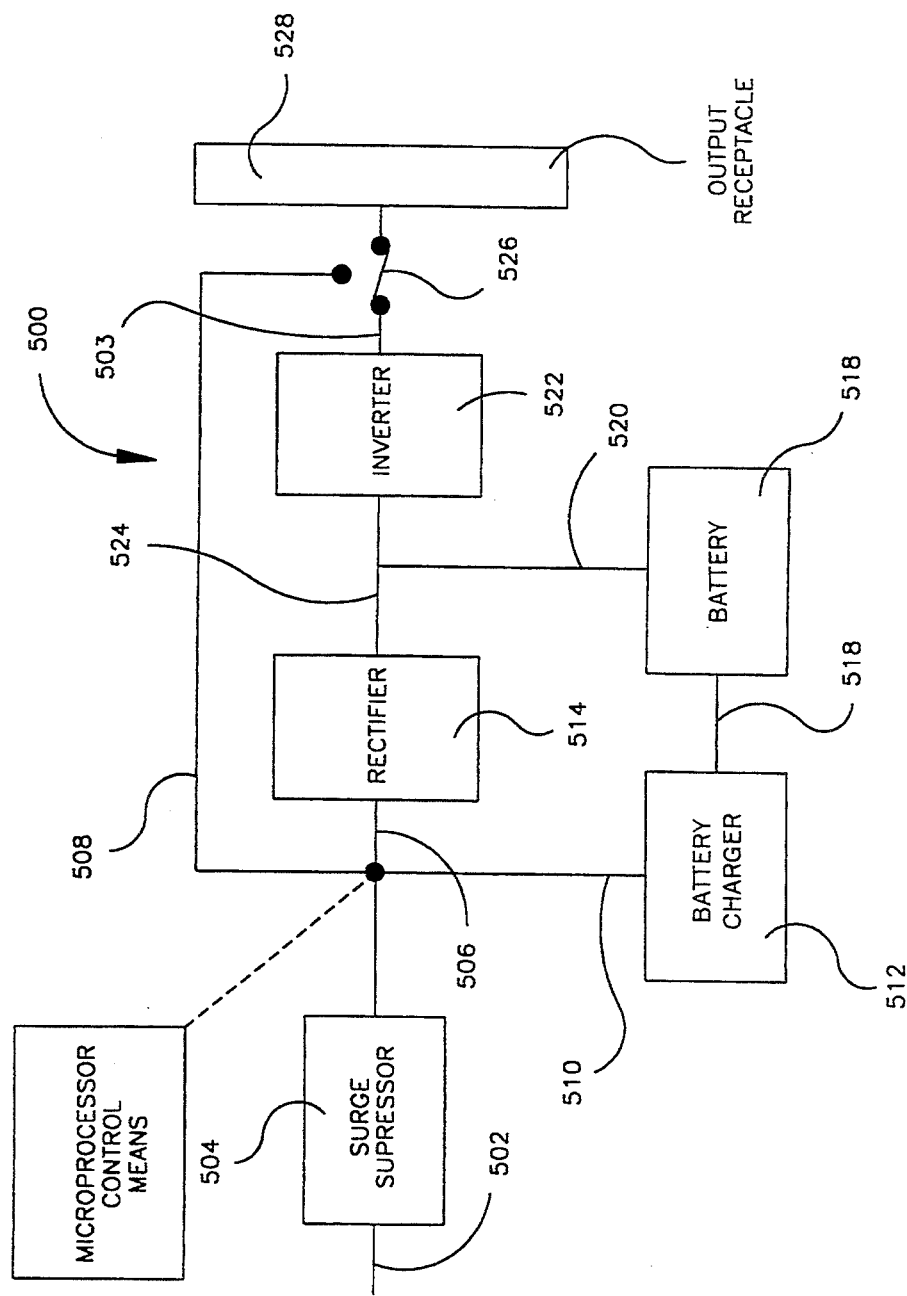
FIG. 5 is a schematic block diagram of a power protection circuit according to one embodiment of the present invention.

The power protected circuit 500 of FIG. 5 comprises a power input line 502 joined to a surge suppresser unit 504 which may additionally have associated therewith EMI and/or RFI filters. The surge suppresser unit 504 in turn is connected in series with rectifier 514 and inverter 522 by lines 506 and 524, respectively. Inverter 522 in turn is connected by line 503 to switch 526 and output receptacle 528.

The circuit shown in FIG. 5 features a first bypass loop 508 by means of which the switch 526 may be connected to divert the power signal from line 506 to the output receptacle 528.

A second loop comprising wires 510, 516, and 520 defines a branch circuit including battery charger 512 and battery 518.

The circuit 500 shown in FIG. 5 is effective to provide protection to sensitive voice, data and telecommunications equipment from corruption or loss of information due to electrical line disturbances. During electrical power failures or brown-outs, the circuit utilizes the internal battery 518 to furnish back-up power. When commercial power is present and received by the circuit through input line 502, filtered and regulated power is furnished and the battery 518 is maintained in a charged condition by means of charger unit 512.

During normal operation of the FIG. 5 circuit, incoming AC commercial power is filtered to reduce spikes and noise. A portion of the utility power is automatically redirected to charger 512 by suitable microprocessor control means 501, to maintain the battery in charged condition. The microprocessor directs the circuit to operate in a bypass mode during the initial start-up, until inverter 522 goes on-line. In the event of an overload or inverter failure, the microprocessor will direct the circuit to go on bypass as an alternate source. During this bypass mode, filtered utility power is provided for the load.

If, however, the utility power introduced in line 502 falls out of tolerance, the inverter 522 remains on-line, deriving power from the battery 518 joined thereto by means of lines 520 and 524. When utility power returns to levels within tolerance, the inverter 522 continues to supply battery power to the output devices via receptacle 528 while recharging battery 518. During extended power outages, battery 518 continues to supply power until nearly discharged, at which time the microprocessor (not shown in FIG. 5) automatically shuts off power to the load.

It will be apparent from the foregoing description that many variations are possible in the multiwire, multicircuit powerway arrangement of the invention. For example, four circuits may be provided, including three power circuits comprising three hot wires and a shared neutral and a shared ground wire, and a separate, dedicated, fourth power circuit with its own hot, neutral, and ground wires. In such arrangement, the first circuit may be unprotected by any power protection means, the second and third circuits may be protected by a PSP device, and the fourth circuit may be protected by a UPS device. Alternatively, a single circuit may have the multiple power protection features associated with the circuit of FIG. 5, while other circuits are unprotected or feature lesser levels of protection than those associated with the FIG. 5 circuit.

Although the invention has been illustratively described herein with specific reference to an 8 wire, 3 circuit system, it will be appreciated that the invention may be practiced in respect of the wall panel assembly with any suitable number of wires and circuits, even a single power circuit where the work station associated with the modular wall panel assembly is dedicated to a specific output device or single activity.

Preferably, however, a multicircuit system is employed and associated with the wall panel assembly, and the powerway (connector) device. As a further example of a multicircuit system, the system may comprise a 3-circuit, 5-wire system comprising three hot wires, a shared neutral, and a shared ground.

The multiwire, multicircuit systems employed in the powerway and modular wall panel assembly may be graded at any suitable current value depending on their construction of operation, as for example 30 amps per circuit.

The powerway, or power connector, preferably defines a multiwire multicircuit system comprising at least two, and preferably at least three, power circuits having associated therewith power circuit receptacle terminals constructed to allow a compatible receptacle element to be selectively positioned on the powerway in power delivery relationship with any selected one of the multiple power circuits.

By this arrangement, a receptacle element may be positioned and repositioned on any of the separate receptacle terminals of the powerway, so that the external output device or circuit may be readily and conveniently switched from one power circuit to another, depending on the desired mode of operation. The powerway in such manner can accommodate a variety of types of receptacle elements, simplex, duplex, triplex, and multiplex units, and each receptacle element be connected to any of the various power circuits of the powerway.

Further, the power way when provided with such multiple receptacle terminals for each of the respective power circuits, can be quickly and easily reconfigured to accommodate a functional change in the workstation activity which is associated with the space bounded by the modular wall panel assembly.

FIGS. 6–13 show various structural parts and views of an input connector, which when fully assembled may be disposed at one end of a powerway (connector). FIGS. 14–18 show various parts and views of an output connector assembly, such as may be disposed at an opposite end of the powerway from the input connector constituted by the assembled parts of FIGS. 6–13.

Accordingly, the powerway may be constituted by a suitable conductor cable of the type shown and described with reference to FIGS. 3A and 3B hereof, e.g., an AWM 8 conductor 1/10 AWG and 7/12 AWG 90° C. 600 volt cable, having at one end an input connector and at an opposite end an output connector, either as a separate and discrete connector assembly, or as integrated in the lower portion wiring raceway of a modular wall panel assembly, as for example of a type as shown and described with reference to FIGS. 1 and 2 hereof.

The connector comprising the input connector assembly and output connector assembly of FIGS. 6–18 may be utilized to define multiple power circuits with which power circuit receptacles may be employed to accommodate circuit coupling with any of the multiple power circuits. The connector may be employed with a modular wall panel assembly and various types of receptacle elements, such as simplex, duplex, triplex, or multiplex units to be connected to any of the various power circuits of the powerway comprising the multiwire system.

Figure 6:
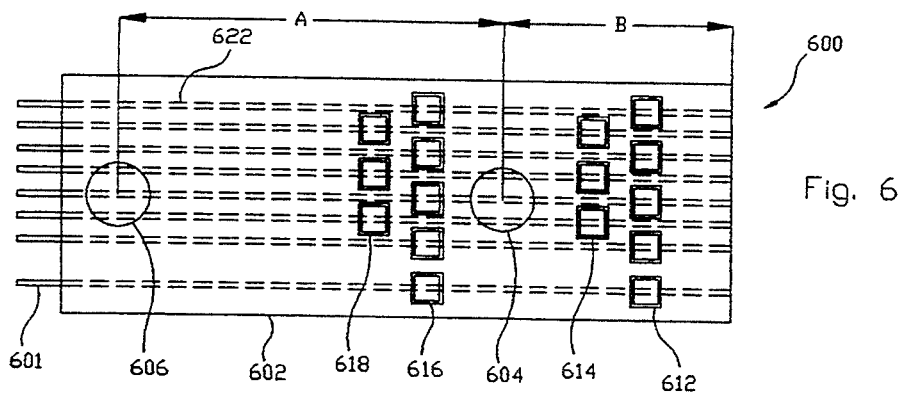
FIG. 6 is a top plan view of an input connector first section, such as may be joined to an input connector second section of the type shown in FIGS. 9–13 to form an input connector compatible with a wall panel assembly constructed in accordance with the present invention.

Referring to FIG. 6, there is shown a top plan view of a first section 600 of an input connector according to one embodiment of the present invention. The first section 600 comprises a main body portion 602 having grooves 622 therein accommodating pin connectors, such as those illustrated in the side elevation view of FIG. 7, wherein pins 608 and 610 are shown in dotted line representation, communicating with terminals in the three terminal array 618, five terminal array 616, three terminal array 614, and five terminal array 612.

The first section main body portion 602 has mounted on its main top surface longitudinally space-apart centering posts 604 and 606, for assisting in coupling of a suitable power transfer means to the quick-disconnect terminals in terminal arrays 612, 614, 616, and 618, as desired.

The longitudinal spacing between centering posts 604 and 606, as measured between centerline $C_1$—$C_1$ of centering post 606 to centerline $C_2$—$C_2$ of centering post 604, is shown as dimension A in FIG. 6, and in a particular embodiment, dimension A may be 3.75 inches, with the corresponding dimension B, between centerline C₂—C₂ and the right-hand extremity of the first section main body portion 602, being on the order of 1.263 inches.

As shown in FIG. 6, the first section main body portion 602 has associated therewith wires 601 of an 8-wire power circuit, with quick-disconnect terminals in arrays 612, 614, 616 and 618 serving to provide connection via the pins 608 and 610 with various power circuits constituted by the 8-wire system. By such arrangement, and appropriate positioning of a power transfer means in connection with selected terminals of the multiple quick-disconnect terminal arrays, a circuit connection to a selected one of the multiple power circuits may be effected.

Figure 7:
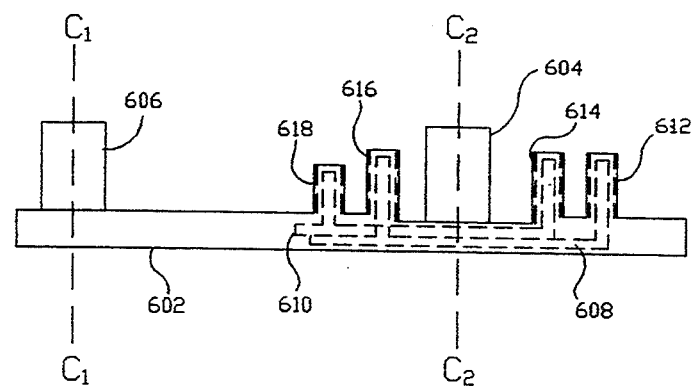
FIG. 7 is side elevation view of the input connector first section shown in FIG. 6.
Figure 8:
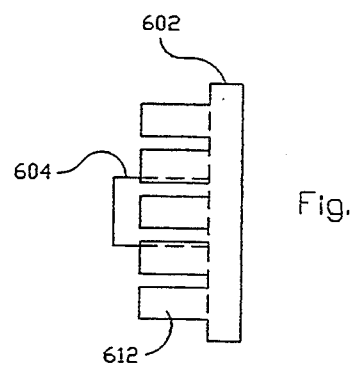
FIG. 8 is an end elevation view of the input connector first section shown in FIG. 6.

FIGS. 7 and 8 show the size relationship of centering post 604 to the terminals of the quick-disconnect terminal array 612.

Figure 9:
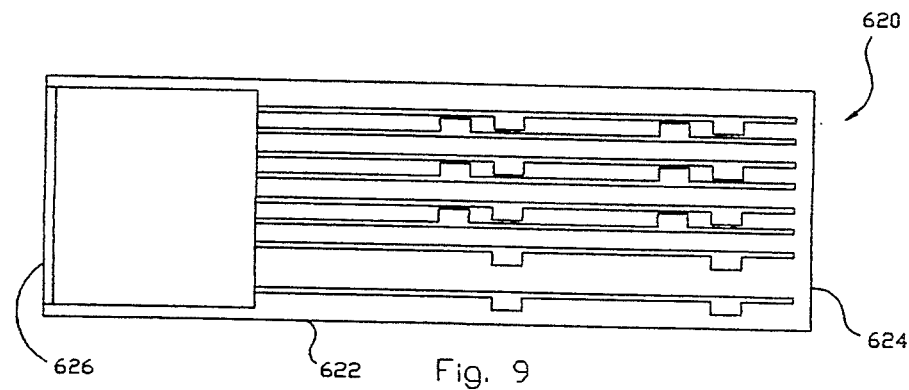
FIG. 9 is a top plan view of a second section of the input connector, matable with the first section shown in FIGS. 6–8.
Figure 10:
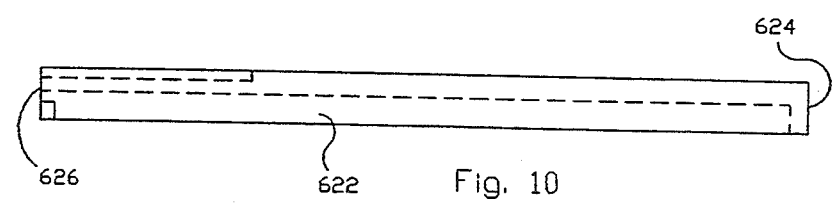
FIG. 10 is a side elevation view of the input connector second section shown in FIG. 9.

FIG. 9 is a top plan view of a second section 620 of the input connector, comprising second section main body portion 622 having end surfaces 624 and 626, as shown. FIG. 10 shows a corresponding side elevation view of the second section main body portion 622, and FIG. 11 is a bottom plan view of the second section.

Figure 11:
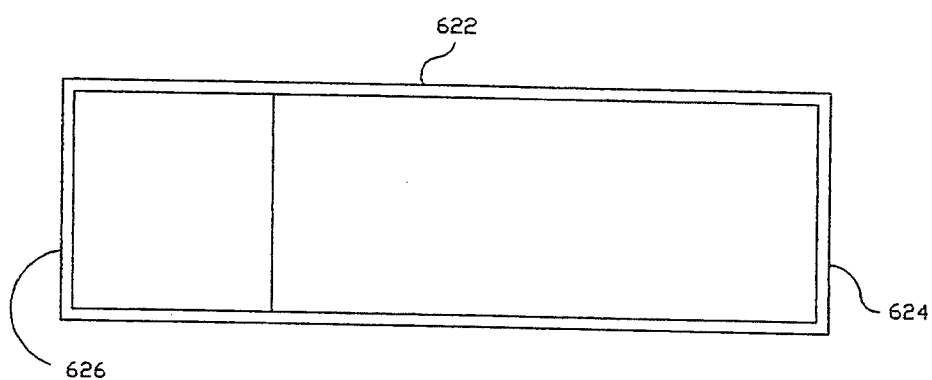
FIG. 11 is a bottom plan view of the input connector second section shown in FIG. 9.
Figure 12:
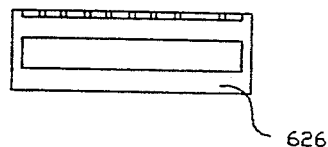
FIG. 12 is an end elevation view of the left-hand end of the input connector second section shown in FIGS. 9–11.
Figure 13:
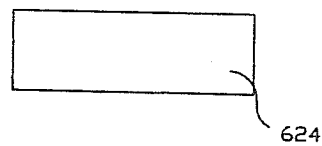
FIG. 13 is an end elevation view of the right-hand end of the input connector second section shown in FIGS. 9–11.

The left-hand end surface of second section main body portion 622 is shown in FIG. 12 (the left-hand and right-hand end surfaces being identified with reference to the position of the main body portion of the second section as shown in FIGS. 9-11). FIG. 13 shows an end elevation view of the right-hand end surface of the second section.

In assembled form, wires 601 (see FIG. 6) are connected to connector pins, such as pins 608 and 610 (see FIG. 7 in the first section of the input connector. The connector protrusion is inserted into tabs on the first section, and the second section then connects to the back of the first section to complete the input connector.

Figure 14:
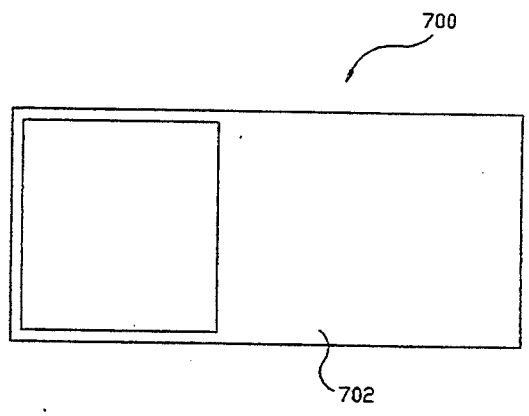
FIG. 14 is a top plan view of a first section of an output connector, such as may be employed at and end of a eight-wire connector cable opposite the end at which the input connector of FIGS. 6–13 is disposed.
Figure 15:
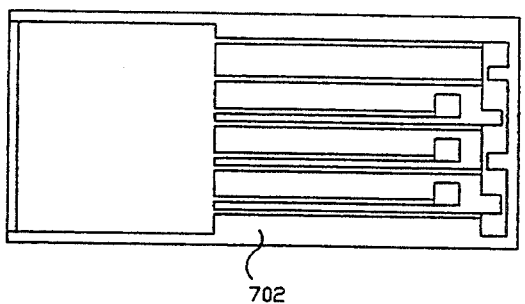
FIG. 15 is a bottom plan view of the output connector first section shown in FIG. 14.

FIGS. 14 and 15 show a first section 700 of an output connector, as comprising a first section main body portion 702, constructed as shown in top plan view in FIG. 14 and as shown in corresponding bottom plan view in FIG. 15, the respective top and bottom faces of the first section main body portion having a suitable body portion thickness therebetween.

Figure 16:
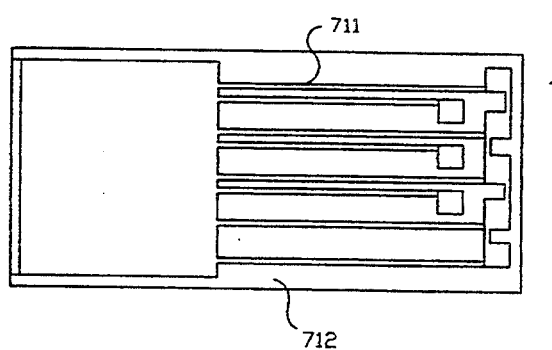
FIG. 16 is a top plan view of a second section of the output connector whose first section is shown in FIGS. 14 and 15, the second section being matable with the first section to form the output connector structure.
Figure 17:
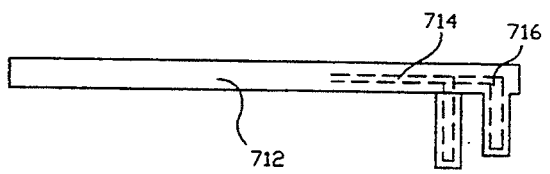
FIG. 17 is a side elevation view of the output connector second section shown in FIG. 16.
Figure 18:
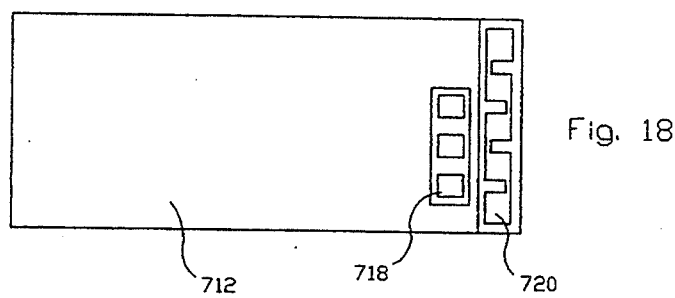
FIG. 18 is a bottom plan view of the second section of the output connector shown in top plan view in FIG. 16 and side elevation view in FIG. 17.

FIG. 16 shows a top plan view of a second section 710 of the output connector, comprising a main body portion 712 having grooves 711 therein for pins, such as pins 714 and 716 illustratively shown in the side elevation view of FIG. 17. The pins extend into the terminals of the three terminal array 718 and the five terminal array 720, shown in the bottom plan view of FIG. 18.

Thus, in the output connector shown in various portions and views in FIGS. 14–18, wires of the multiwire system are connected to pins as in the input connector, and are inserted into the second section 710 with the pin protrusions extending into the connector sockets of the quick-disconnect terminals. The first section then connects to the back of the second section to hold the pins in place and complete the output connector assembly.

Accordingly, while the invention has been shown and described with respective to specific aspects, features, and embodiments, it will be apparent that numerous variations, modifications, and embodiments are possible, and all such variations, modifications, and embodiments are to regarded as being within the spirit and scope of the invention.

What is claimed is:

1. A modular wall panel assembly comprising a space-dividing modular wall panel member having a concealed prewired electrical system associated therewith comprising a multiwire powerway interiorly disposed in the wall panel member and defining at least one power circuit, and including means for connecting the powerway to an external power supply means and means for connecting the powerway to output circuit(s) or device(s) disposed exteriorly of the wall panel member, with the powerway coupled to at least one power protection means interiorly disposed in the wall panel member and providing power protection to a power circuit thereof and to the output circuit(s) or device(s) disposed exteriorly of the wall panel which are disposed in current carrying relationship through the connecting means with the power circuit(s) wherein the power protection means comprises at least one member selected from the group consisting of (i) power surge protector (PSP) means, and (ii) uninterruptable power supply (UPS) means.

2. A modular wall panel assembly according to claim 1, wherein the multiwire powerway defines multiple power circuits.

3. A modular wall panel assembly according to claim 1, wherein the power protection means comprises PSP means and UPS means, in a multiloop power protection circuit coupled to at least one power circuit of the modular wall panel assembly, wherein the power protection circuit comprises a power surge suppressor unit, a rectifier unit, and an inverter unit, respectively, connected by a main power protection circuit line in series relationship with one another between the power circuit(s) and the output circuit(s) or device(s) connection means, with a first branch loop of the power protection circuit being joined at a first end thereof to the main power protection circuit line between the surge suppressor unit and the rectifier unit, and containing a battery charger in series relationship with a battery chargeable thereby, the first branch loop at the second end thereof being joined to the inverter unit, so that the battery is coupled to the inverter unit and a second branch loop of the power protection circuit being joined at a first end thereof to the main power protection circuit line between the surge suppressor unit and the rectifier unit, and being joined at a second end thereof to a bypass switch coupleable to the main power protection circuit line between the inverter unit and the output circuit(s) or device(s) connection means, to thereby bypass the rectifier unit and the inverter unit.

4. A modular wall panel assembly according to claim 3, wherein the power protection circuit is constructed and arranged to direct (i) a portion of the power entering the main power protection circuit line into the first branch loop of the circuit for charging of the battery during normal operation, so that the battery is maintained in a charged state, (ii) the power entering the main power protection circuit line, upon overload or inverter failure, into the second branch loop of the circuit, (iii) power from the battery to the inverter unit in the event of a deficit in the power entering the main power protection circuit line from the external power supply means, (iv) charging of the battery upon return of desired power entering the main power protection circuit line from the external power supply means subsequent to condition (iii), and (v) shut-off of power to the output circuit(s) or device(s) upon discharging of the battery to a predetermined low level of charge subsequent to extended occurance of condition (iii).

5. A modular wall panel assembly according to claim 4, wherein the power protection circuit comprises microprocessor control means to control the directed functions.

6. A modular wall panel assembly according to claim 1, wherein the power circuit which is afforded power protection further comprises power input filtering means.

7. A modular wall panel assembly according to claim 6, wherein the power circuit power input filtering means comprise means selected from the group consisting of electromagnetic interference (EMI) filters, radio frequency interference (RFI) filters, and combinations thereof.

8. A modular wall panel assembly according to claim 1, wherein the powerway defines at least three power circuits, comprising a first power circuit which is unprotected by any power protection means, a second power circuit which is protected by a PSP device, and a third power circuit which is protected by a UPS device.

9. A modular wall panel assembly according to claim 1, wherein the powerway comprises an 8-wire system defining 3 power circuits including 3 hot wires with a shared neutral wire and a shared ground wire, and a separate, dedicated, fourth power circuit with its own hot, neutral, and ground wires.

10. A modular wall panel assembly according to claim 9, wherein the first circuit is unprotected by any power protection means, the second and third circuits are protected by a PSP device, and the fourth circuit is protected by a UPS device.

11. A modular wall panel assembly according to claim 1, wherein the powerway comprises a 5-wire, three circuit system.

12. A modular wall panel assembly according to claim 1, wherein the power protection means comprises PSP means and UPS means, in a multiloop power protection circuit coupled to at least one power circuit of the modular wall panel assembly, wherein the power protection circuit comprises a power surge suppressor unit of a fuse-element-type, a rectifier unit, and an inverter unit, respectively, connected by a main power protection circuit line in series relationship with one another between the power circuit(s) and the output circuit(s) or device(s) connection means, with a first branch loop of the power protection circuit being joined at a first end thereof to the main power protection circuit line between the surge suppressor unit and the rectifier unit, and containing a battery charger in series relationship with a battery chargeable thereby, the first branch loop at the second end thereof being joined to the inverter unit, so that the battery is coupled to the inverter unit and a second branch loop of the power protection circuit being joined at a first end thereof to the main power protection circuit line between the surge suppressor unit and the rectifier unit, and being joined at a second end thereof to a bypass switch coupleable to the main power protection circuit line between the inverter unit and the output circuit(s) or device(s) connection means, to thereby bypass the rectifier unit and the inverter unit.

13. A modular wall panel assembly according to claim 12, wherein the power protection circuit is constructed and arranged to direct (i) a portion of the power entering the main power protection circuit line into the first branch loop of the circuit for charging the battery during normal operation, so that the battery is maintained in a charged state, (ii) the power entering the main power protection circuit line, upon overload or inverter failure, into the second branch loop of the circuit, (iii) power from the battery to the inverter unit in the event of a deficit in the power entering the main power protection circuit line from the external power supply means, (iv) charging of the battery upon return of desired power entering the main power protection circuit line from the external power supply means subsequent to condition (iii), and (v) shut-off of power to the output circuit(s) or device(s) upon discharging of the battery to a predetermined low level of charge subsequent to extended occurance of condition (iii).

14. A modular wall panel assembly according to claim 13, wherein the power protection circuit comprises power input filtering means.

15. A modular wall panel assembly comprising a space-dividing modular wall panel member having a concealed prewired electrical system associated therewith comprising a multiwire powerway defining a multiplicity of power circuits, and including means for connecting the powerway to an external power supply means and means for connecting the powerway to output circuit(s) or device(s) disposed exteriorly of the wall panel member, with the powerway coupled to at least one power protection means interiorly disposed in the wall panel member and providing power protection to at least one power circuit thereof, wherein the at least one power protection means comprises (i) power surge protector (PSP) means, and (ii) uninterruptable power supply (UPS) means, in a multiloop power protection circuit coupled to at least one power circuit of the modular wall panel assembly, wherein the power protection circuit comprises a power surge suppresser unit, a rectifier unit, and an inverter unit, respectively, connected by a main power protection circuit line in series relationship with one another between the power circuit(s) and the output circuit(s) or device(s) connection means, with a first branch loop of the power protection circuit being joined at a first end thereof to the main power protection circuit line between the surge suppresser unit and the rectifier unit, and containing a battery charger in series relationship with a battery chargeable thereby, the first branch loop at a second end thereof being joined to the inverter unit, so that the battery is coupled to the inverter unit, and a second branch loop of the power protection circuit being joined at a first end thereof to the main power protection circuit line between the surge suppresser unit and the rectifier unit, and being joined at a second end thereof to a bypass switch selectively coupleable to the main power protection circuit line between the inverter unit and the output circuit(s) or device(s) connection means, to thereby bypass the rectifier unit and the inverter unit, wherein the power protection circuit is constructed and arranged to direct (i) a portion of the power entering the main power protection circuit line into the first branch loop of the circuit for charging of the battery during normal operation, so that the battery is maintained in a charge state, (ii) the power entering the main power protection circuit line, upon overload or inverter unit failure, into the second branch loop of the circuit, (iii) power from the battery to the inverter unit in the event of a deficit in the power entering the main power protection circuit line from the external power supply means, (iv) charging of the battery upon return of desired power entering the main power protection circuit line from the external power supply means subsequent to condition (iii), and (v) shut-off of power to the output circuit(s) or device(s) upon discharging of the battery to a predetermined low level of charge subsequent to extended occurrence of condition (iii), wherein the power protection circuit comprises power input filtering means, and wherein the powerway comprises a flag connector having quick-disconnect terminals at extremities thereof, with the flag connector being constructed and arranged to effect panel-to-panel connection when the wall panel assembly is utilized in an array comprising a multiplicity of such wall panel assemblies.

16. A modular wall panel assembly comprising a space-dividing modular wall panel member having a concealed prewired electrical system associated therewith comprising a multiwire powerway defining a mulitplicity of power circuits, and including means for connecting the powerway to an external power supply means and means for connecting the powerway to output circuit(s) or device(s) disposed exteriorly of the wall panel member, with the powerway coupled to at least one power protection means interiorly disposed in the wall panel member and providing power protection to at least one power circuit thereof, wherein the at least one power protection means comprises (i) power surge protector (PSP) means, and (ii) uninterruptable power supply (UPS) means, in a multiloop power protection circuit coupled to at least one power circuit of the modular wall panel assembly, wherein the at least one power protection circuit comprises a power surge suppresser unit, a rectifier unit, and an inverter unit, respectively, connected by a main power protection circuit line in series relationship with one another between the power circuit(s) and the output circuit(s) or device(s) connection means, with a first branch loop of the power protection circuit being joined at a first end thereof to the main power protection circuit line between the surge suppresser unit and the rectifier unit, and containing a battery charger in series relationship with a battery chargeable thereby, the first branch loop at a second end thereof being joined to the inverter unit, so that the battery is coupled to the inverter unit, and a second branch loop of the power protection circuit being joined at a first end thereof to the main power protection circuit line between the surge suppressor unit and the rectifier unit, and being joined at a second end thereof to a bypass switch selectively coupleable to the main power protection circuit line between the inverter unit and the output circuit(s) or device(s) connection means, to thereby bypass the rectifier unit and the inverter unit, wherein the power protection circuit is constructed and arranged to direct (i) a portion of the power entering the main power protection circuit line into the first branch loop of the circuit for charging of the battery during normal operation, so that the battery is maintained in a charge state, (ii) the power entering the main power protection circuit line, upon overload or inverter unit failure, into the second branch loop of the circuit, (iii) power from the battery to the inverter unit in the event of a deficit in the power entering the main power protection circuit line from the external power supply means, (iv) charging of the battery upon return of desired power entering the main power protection circuit line from the external power supply means subsequent to condition (iii), and (v) shut-off of power to the output circuit(s) or device(s) upon discharging of the battery to a predetermined low level of charge subsequent to extended occurrence of condition (iii), wherein the power protection circuit comprises power input filtering means, and wherein the powerway has associated therewith power circuit receptacle terminals constructed to allow a compatible receptacle element to be selectively positioned on the powerway in power delivery relationship with any selected one of the multiple power circuits, so that the external output circuit(s) or device(s) are switchable from one power circuit to another, and with the powerway being constructed and arranged to accommodate multiple types of receptacle elements selected from the group consisting of simplex, duplex, triplex, and multiplex receptacle elements.

* * * * *